(12) United States Patent
Xie et al.

(10) Patent No.: US 8,095,938 B1
(45) Date of Patent: Jan. 10, 2012

(54) MANAGING ALERT GENERATION

(75) Inventors: Ying Xie, Northborough, MA (US);
Sriram Krishnan, Shrewsbury, MA (US); Neil F. Schutzman, Marlborough, MA (US); Ping Zhang, Shrewsbury, MA (US); Munish Desai, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1053 days.

(21) Appl. No.: 12/005,011

(22) Filed: Dec. 21, 2007

(51) Int. Cl.
*G06F 9/44* (2006.01)
*G06F 19/00* (2011.01)
(52) U.S. Cl. ...................................................... 719/318
(58) Field of Classification Search .................. 719/318
See application file for complete search history.

(56) References Cited

U.S. PATENT DOCUMENTS

| 7,225,103 | B2* | 5/2007 | Beresniewicz et al. | 702/179 |
| 7,715,396 | B2* | 5/2010 | Castro et al. | 370/392 |
| 2008/0104086 | A1* | 5/2008 | Bare et al. | 707/100 |
| 2010/0064039 | A9* | 3/2010 | Ginter et al. | 709/224 |

OTHER PUBLICATIONS

T. Roney, "Cluster monitoring at NCSA"; University of Illinois, USA, 2001.*

* cited by examiner

*Primary Examiner* — Lechi Truong
*Assistant Examiner* — Abdou Seye
(74) *Attorney, Agent, or Firm* — Krishnendu Gupta; Jason A. Reyes; Deepika Bhayana

(57) ABSTRACT

Alert generation is managed. A frequency with which a performance metric satisfies a first condition is determined. It is determined whether the frequency satisfies a second condition. An alert is generated based on the determinations.

14 Claims, 5 Drawing Sheets

MANAGING ALERT GENERATION

BACKGROUND

1. Technical Field

This application relates to managing alert generation.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems, also referred to as server systems, may store and retrieve data using a storage device containing a plurality of host interface units, disk drives, and disk interface units. The host systems access the storage device through a plurality of channels provided therewith. Host systems provide data and access control information through the channels to the storage device, and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Electronic monitoring is commonly employed to monitor the state of a system such as the storage device. Electronic monitoring is employed to generate alerts if the monitored system fails to perform satisfactorily in some manner. Monitoring can be performed on a system-wide basis or on one or more components of the system.

One of the most common ways to continuously monitor a system is by periodic sampling. In periodic sampling, the state of the monitored system is sampled on a periodic schedule. In a typical monitoring situation, some predefined alert threshold is specified. If the value of the most recently obtained sample of data exceeds the predefined alert threshold, an alert is generated. If the most recently obtained sample falls below the threshold, no alert is generated.

This method of alert generation can be susceptible to transient conditions. For example, if the state of the monitored system swings rapidly above and below the predefined alert threshold every sampling period or every few sampling periods, alerts are alternately sent and suppressed. If the sampling period is relatively high, e.g., many times per second or per minute, the alert signal simply jitters on and off.

SUMMARY OF THE INVENTION

Alert generation is managed. A frequency with which a performance metric satisfies a first condition is determined. It is determined whether the frequency satisfies a second condition. An alert is generated based on the determinations.

One or more implementations of the invention may provide one or more of the following advantages.

Alerts can be generated that are highly meaningful and highly likely to convey useful and accurate information. Alerts that are not highly meaningful and not highly likely to convey useful and accurate information can be avoided or reduced. In the case of customer service, where alerts are tied to a customer service center through an event monitor and a customer service tool, the number of customer service calls can be reduced and service costs can be reduced.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

An important aspect of storage device management is providing a user with an alert when an event occurs, such as a failure of a device or a change in the state of a device. Alerts serve as the first line of notification of a problem or other event to an administrator. Without alerts, minor events may become critical events, or worse, critical events may go unnoticed until a large-scale system failure occurs.

Conventional technologies for generating an alert typically use a message distribution system, such as e-mail or paging, to deliver an alert to an administrator.

In a technique described below, alert generation is managed. In general, a performance alert needs to be generated when a performance metric value exceeds a threshold, and the performance alert needs to be removed when the performance metric value does not exceed the threshold. Performance metrics such as utilization, throughput and bandwidth may frequently fluctuate at the threshold level so that, conventionally, it causes numerous creating/deleting alert operations.

Threshold frequency control is a mechanism to reduce the number of operations of creating/deleting for metrics alerts. A sliding window, a threshold frequency, and a performance metric threshold are used in an implementation of the technique to monitor storage system performance for generating performance alerts. In the implementation, a performance alert is generated only if an event, in which a storage system performance metric value exceeds a threshold, occurs a number of times in a sliding window, and a high threshold watermark and a low threshold watermark are used to reduce creating/removing alerts operations. In order to use memory efficiently in the implementation, up to 60 bits of memory allocation for each object is used to track the number of threshold occurrences in the sliding window. Each bit represents a state which indicates whether a performance metric value exceeds the threshold. Each bit also represents a poll cycle, which is one slice of time period in the sliding window. Both event occurrence frequency and timestamp information are captured in a 60-bit memory for a single object.

As shown below, the technique helps provide accurate information to users and, in at least one implementation, helps use memory efficiently since separate timestamps of events do not need to be stored in memory.

Figure 1:
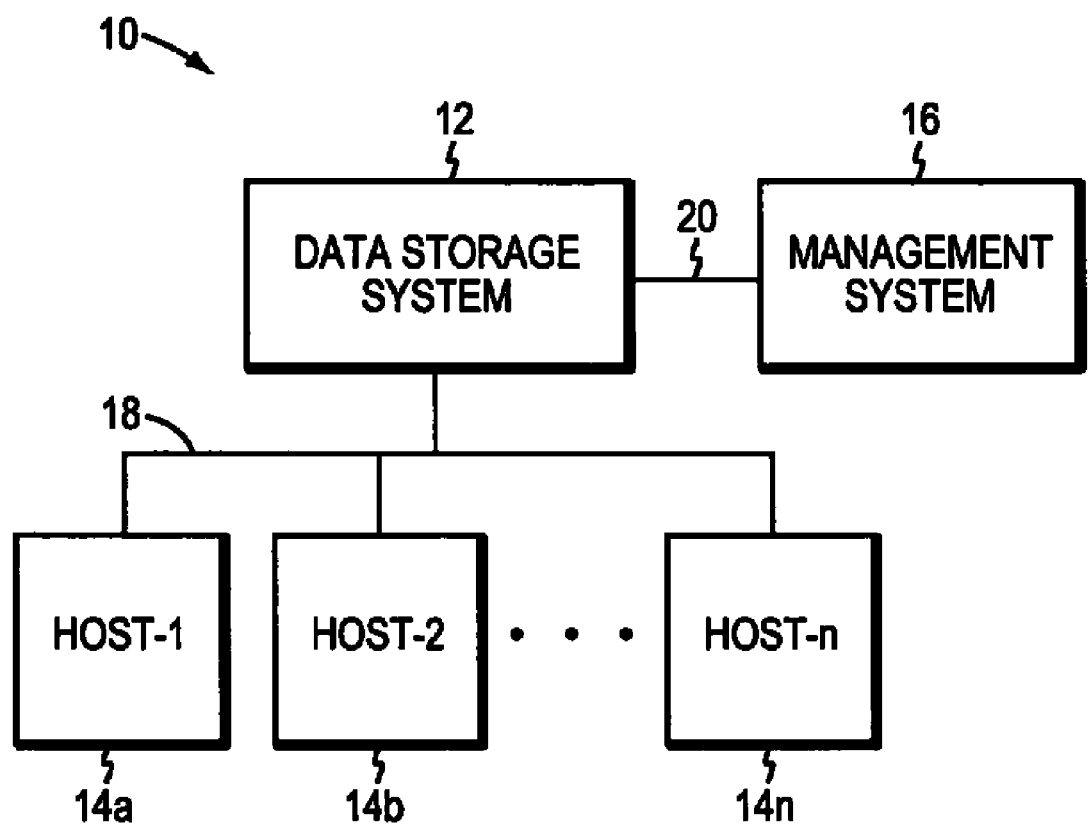
FIG. 1 is an example of an embodiment of a computer system that may utilize the techniques described herein.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

Figure 2:
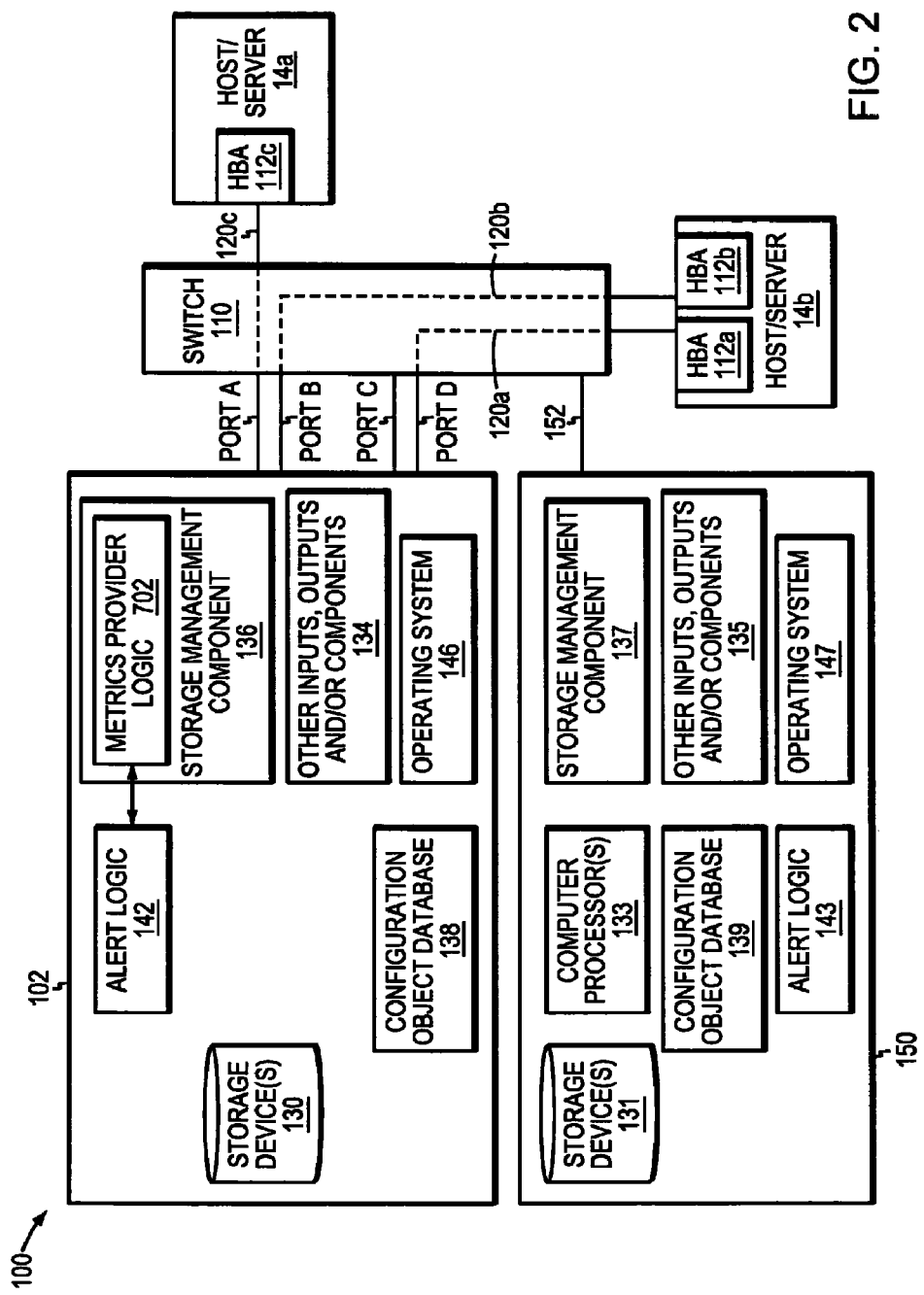
FIG. 2 illustrates in more detail components that may be included in an embodiment of the system of FIG. 1.

Referring now to FIG. 2, shown is an example 100 of components that may be used in connection with techniques described herein. The example 100 may represent components illustrated in connection of FIG. 1 configured in a storage area network (SAN). Included in the example 100 are data storage systems 102 and 150, a switch 110, and hosts or servers 14a and 14b. The switch 110 may be used in connection with facilitating communications between each of the hosts 14a and 14b and the data storage systems 102 and 150. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs. In connection with the techniques described herein, other embodiments may use other ways in defining a path that may vary with the connectivity in each embodiment.

Each HBA may include one or more ports although in the example illustrated, each HBA has only a single port. As represented with element 152, connections between the hosts using switch 110 may be made with respect to data storage system 150. Although only two data storage system are illustrated for purposes of simplicity in illustration, each of the hosts may have connections to other data storage systems in the SAN. Additionally, each host may be connected to the data storage systems 102, 150 using other connections, including direct cabling, than as illustrated in FIG. 2.

The data storage systems 102, 150 are illustrated as each including one or more storage devices 130, 131, one or more computer processors 132, 133, an operating system 146, 147, a configuration object database 138, 139, a storage management component 136, 137, other inputs, outputs and/or components 134, 135, and alert logic 142, 143 which may include all or some of other logic described below.

An example of an embodiment of the data storage system 102 is the CLARiiON™ data storage system by EMC Corporation which includes two computer processors as represented by the element 132 although an embodiment may include a different number of processors for use in connection with the techniques described herein.

The one or more storage devices 130 may represent one or more physical devices, such as disk drives, that may be accessed in logical units (e.g., as LUNs) as described elsewhere herein.

The operating system 146 may be any one of a variety of commercially available, proprietary, or other operating system capable of execution by the one or more computer processors 132 in accordance with the particulars of the data storage system 102. In one embodiment, the operating system 146 may be or be based on the Windows XP™ operating system by Microsoft Corporation.

An embodiment of the data storage systems 12 may include, e.g., within alert logic 142, 143, an implementation of the technique by which alert generation is managed and, in particular, threshold frequency control is provided. Since values of utilization, throughput, bandwidth may frequently fluctuate at a threshold level, it is undesirable in at least some cases to have numerous creating/removing alerts operations for this circumstance. Threshold frequency control helps reduce creating/removing alerts operations. A threshold watermark (e.g., 10 percent of the threshold frequency) may also be used to reduce creating/removing alerts operations.

In at least one implementation, the threshold frequency control is based on real time metrics, and a time window is used to monitor the frequency of metric threshold change. The implementation keeps track of the frequency of metric threshold change efficiently in order to avoid excessive memory usage.

Threshold frequency and interval may be predefined per threshold and may be used internally.

Threshold frequency control is applied to two different levels, i.e., system level and group level. Each system contains some logical groups to organize physical or logical components. The following are group examples:
Storage system—LUNs, disks, storage processors
RAID group—LUNs, disks
Storage group—LUNs With respect to group level, the threshold has the occurrence frequency and interval specified explicitly. Depending on the implementation, support system groups and/or user defined groups may be supported.

Figures 3, 4:
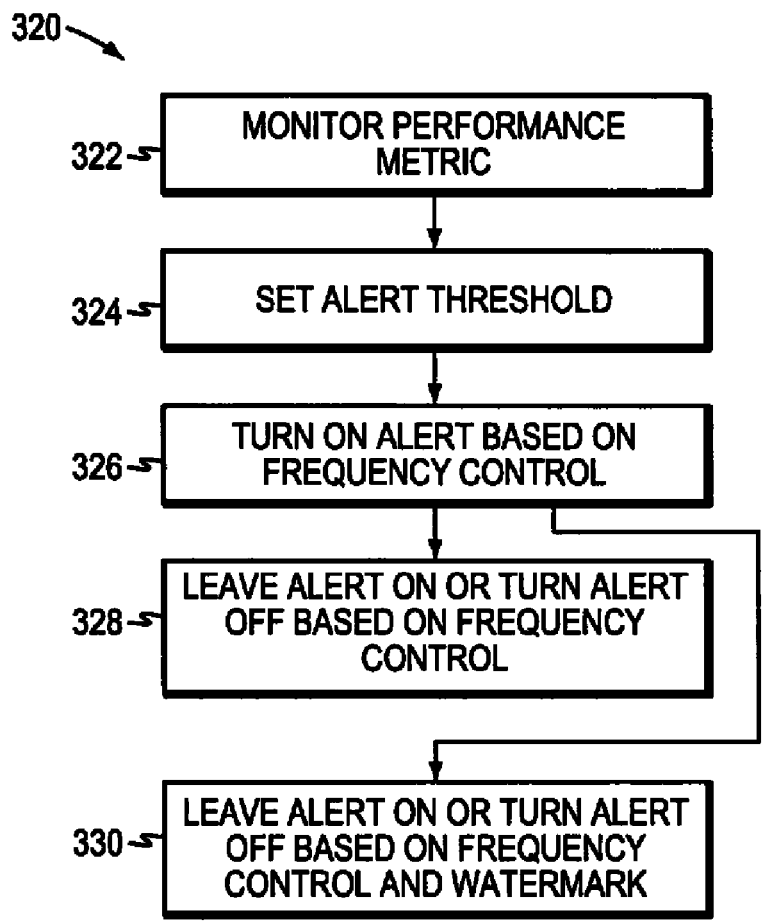
FIGS. 3, 6 are flow diagrams of procedures for use with the computer system of FIGS. 1-2.
FIGS. 4-5 are diagrams of data structures for use with the computer system of FIGS. 1-2.

With respect to memory usage, as shown in FIG. 4, a bitmap having a bit length of n is used to represent a time window. Each bit is used to represent the condition state in a single poll cycle, i.e., the result of a sample. The bitmap is shifted as a shift register when the window is moved forward, so that the oldest bit is dropped, the second oldest bit becomes the oldest bit, and so on.

At least one example implementation has the following parameters:
Window size T=n poll cycles, T<=60 minutes
Poll cycle=1 minute
Number of time slots=n
Frequency m<number of time slots in the window With respect to alerting and notification in at least one implementation, metrics provider logic publishes alert information objects to alert provider logic, and metrics alerts are managed by the alert provider logic as other alerts are managed. FIG. 2 illustrates an example in which storage management component 136 includes metrics provider logic 702 which publishes information to or otherwise interacts with alert logic 142. Metrics may be calculated from raw counter data obtained from various components (system 100 may make only raw performance counters, so that metric provider logic 702 needs to compute performance metrics).

Current event monitor logic may be used to send notifications for events specified in a monitoring template, and the event monitor logic's template may be applied to the storage system level.

Figure 5:
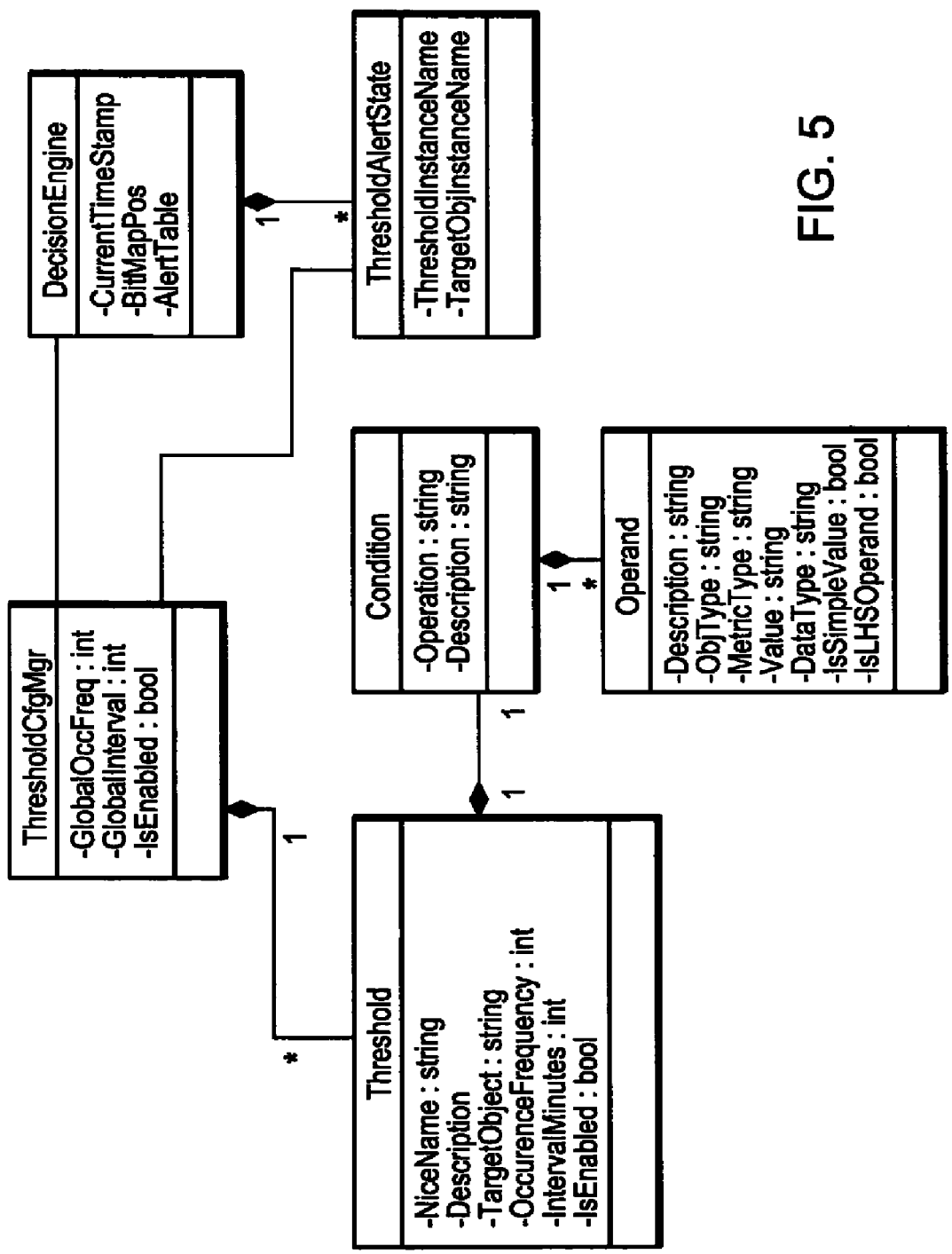

With respect to implementation logic, FIG. 5 illustrates a class diagram describing classes that are defined for metric threshold configuration management and metric decision engine. Class ThresholdCfgMgr provide interfaces to allow the user to add, modify, remove, and/or reset thresholds, manage default and customized thresholds, read and save a configuration (e.g., from and to an XML file such as thresholdCfg.xml), and enable and disable threshold functions. Class DecisionEngine polls metrics and runs every threshold, tracks threshold alert states, publish alert information objects to the alert provider logic, and log events to an event monitor log.

Figure 6:
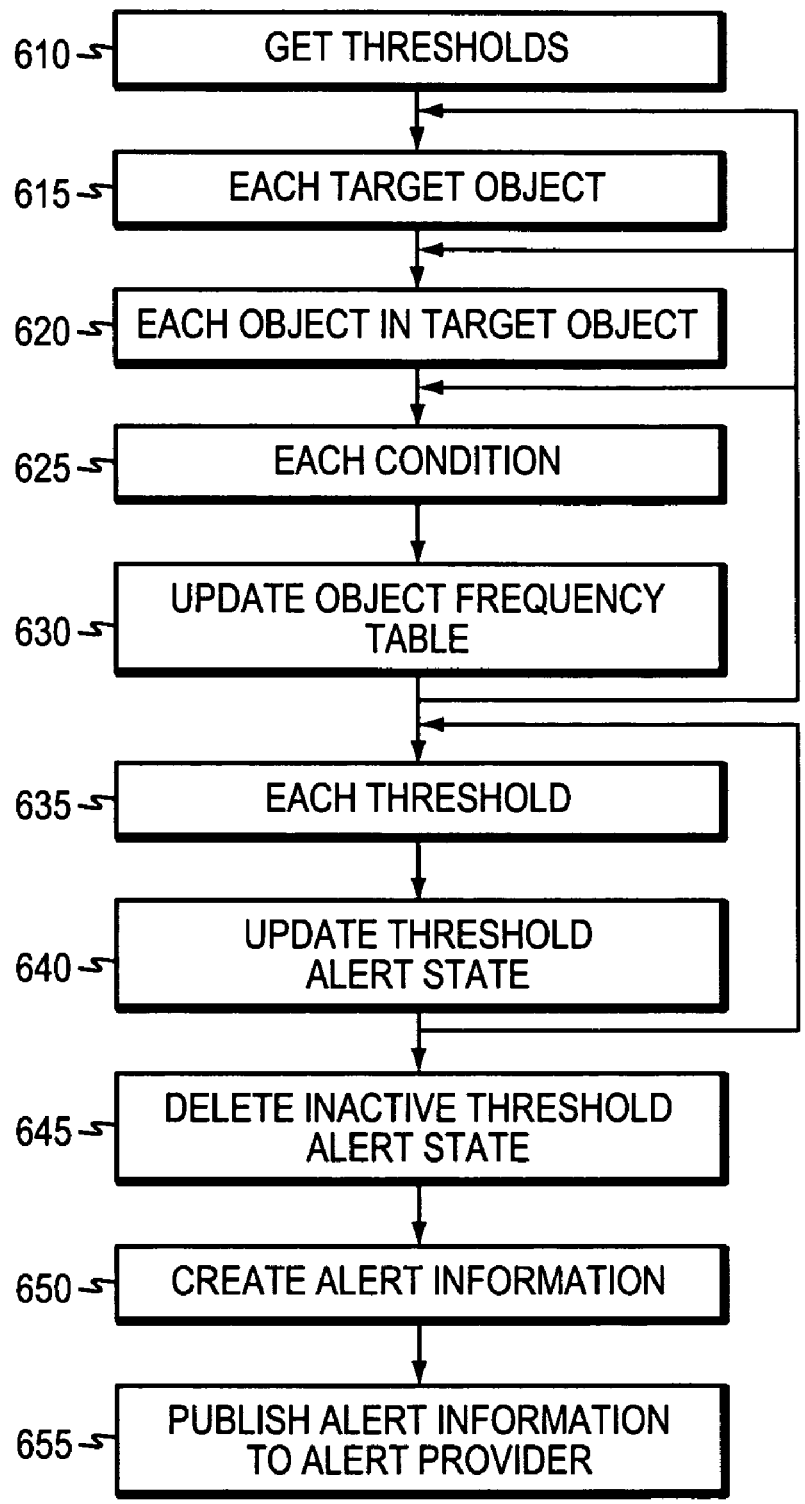

FIG. 6 illustrates a flowchart of a sample procedure that may be used with the technique. Thresholds are retrieved (step 610). An object frequency table is updated with frequencies (step 630) for each condition (step 625) of each target object (step 615) and each object in each target object (step 620) in the system. (In at least one implementation, a target object is a system group.) For each threshold (step 635) a threshold alert state is updated to on or off based on the frequencies and the thresholds (step 640). Each threshold alert state that is updated to off, if any, is deleted (step 645). Alert information is created (step 650) and is published to the alert provider logic (step 655)

At least one implementation may be based on software that runs on a processor of storage device 130. For example, referring now to FIG. 3 and flowchart 320, a performance metric based on LUN utilization may be monitored (step 322), e.g., to help to determine how busy the LUN is. A corresponding alert threshold (e.g., at 80% of full LUN utilization) may be set (step 324). In accordance with the technique described herein, frequency control is applied such that if LUN utilization is detected to exceed the threshold a specified number of times (e.g., 5 times) within a defined period of time (e.g., 60 minutes), an alert is turned on (step 326). (The performance metric is analyzed within a sliding window represented by the bitmap, such that as a new sample is added, the oldest sample is dropped.) Thereafter, under frequency control, as long as at least, e.g., 5 bits in the bitmap are set, indicating a frequency of 5 because the threshold has been exceeded at least 5 times within the window, the alert is left on; otherwise, the alert is turned off (step 328). (In the example, each sample may represent a snapshot at a one minute interval or an average over a corresponding minute.) Thus, frequency control helps avoid generating alerts based on momentary blips in the performance metric.

In an enhanced implementation of the technique, a watermark is used to help increase the effectiveness of the technique. For example, a 20% watermark may be used so that at least a 20% change in the frequency is required in order to change the alert state, e.g., from on to off (step 330). Thus, in a case in which a 20% watermark is used with a frequency of 10 that caused an alert to turn on, the frequency must fall to 8 or below before the alert is turned off.

In further enhanced implementations of the technique, the watermark or a different watermark may be used instead or in addition before the alert is turned on, and/or one or more additional watermarks may be used to allow degrees of severity in alert levels as the frequency increases (e.g., yellow alert, orange alert, red alert).

Since each sample is logged, once the alert is turned on, it can trigger an analysis of the log, e.g., to determine a pattern and/or what went wrong to cause a problem to lead to the alert.

In at least one implementation, storage device 130 runs an operating system that periodically makes available updated performance statistics about devices (e.g., disks and LUNs) and groups of devices (e.g., RAID groups and storage groups), and a bitmap as described above is maintained for each such device and group of devices. The bitmap may be updated each time updated statistics are made available, and updating corresponding alert status may also be performed at that time.

The technique may be executed at any location, e.g., in the storage device or in a host, that has access to the performance statistics. The technique may be executed on historical performance data. The technique may be executed using one or more combinations of thresholds and/or frequencies.

It should be noted that the various components used in connection with the techniques described herein may be implemented using hardware and/or software. For example, the components of the capture engine and/or duplication engine may be written in any one or more programming and/or scripting languages such as, for example, C++, Java, and XML.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing alert generation, the method comprising:
using an object frequency table to track a performance metric for an object, wherein each entry of the object frequency table represents a condition state in a single poll cycle, wherein the condition state indicates whether the performance metric value exceeds a threshold associated with the performance metric;
updating the object frequency table based on the performance metric value exceeding the threshold;
determining a frequency with which the performance metric for the object exceeds the threshold, wherein the frequency indicates a number of times the performance metric has exceeded the threshold, wherein the frequency is determined from each condition state of the object frequency table;
determining whether the frequency exceeds a threshold frequency associated with the object within a time interval;
updating a status of an alert for the object, wherein the status is updated based on a rate at which the frequency changes and comparing the rate at which the frequency changes to a threshold watermark;
based on the status of the alert, deleting an inactive alert, wherein the inactive alert indicates that the frequency has dropped below the threshold watermark;
generating an alert based on an alert information object that is published to an alert provider logic.

2. The method of claim 1, further comprising: basing the frequency determination on applying a sliding window to the performance metric.

3. The method of claim 1, further comprising: using a bitmap allocated in memory to track a number of threshold occurrences of a performance metric for an object in a sliding window, wherein the bitmap includes a set of bits.

4. The method of claim 3, wherein each bit of the set of bits in the bitmap represents a state which indicates whether the performance metric value exceeds the threshold.

5. The method of claim 3, further comprising: using each bit of the set of bits in the bitmap to represent a condition state in a single poll cycle.

6. The method of claim 3, further comprising: shifting each bit of the set of bits in the bitmap as a shift register when a time window for samples is moved forward.

7. The method of claim 3, wherein each bit of the set of bits in the bitmap represents a poll cycle in the sliding window.

8. The method of claim 1, wherein the threshold frequency and the time interval are predefined per threshold.

9. The method of claim 1, wherein the threshold frequency is applied to first and second levels.

10. The method of claim 9, wherein the first level includes a system level for a system having logical groups to organize components of the system.

11. The method of claim 9, wherein the second level includes a group level for a group of components of the system.

12. The method of claim 11, wherein the group level has an occurrence frequency and interval specified explicitly.

13. The method of claim 1, further comprising: calculating the performance metric from a raw counter data.

14. The method of claim 1, further comprising: basing the generation of the alert on a notification for an event specified in a monitoring template.

* * * * *